M. G. CARNEY.
STEAM TRAP.
APPLICATION FILED DEC. 1, 1915.

1,199,245.

Patented Sept. 26, 1916.
2 SHEETS—SHEET 1.

INVENTOR
Michael G. Carney
BY
ATTORNEY

M. G. CARNEY.
STEAM TRAP.
APPLICATION FILED DEC. 1, 1915.
1,199,245.
Patented Sept. 26, 1916.
2 SHEETS—SHEET 2.
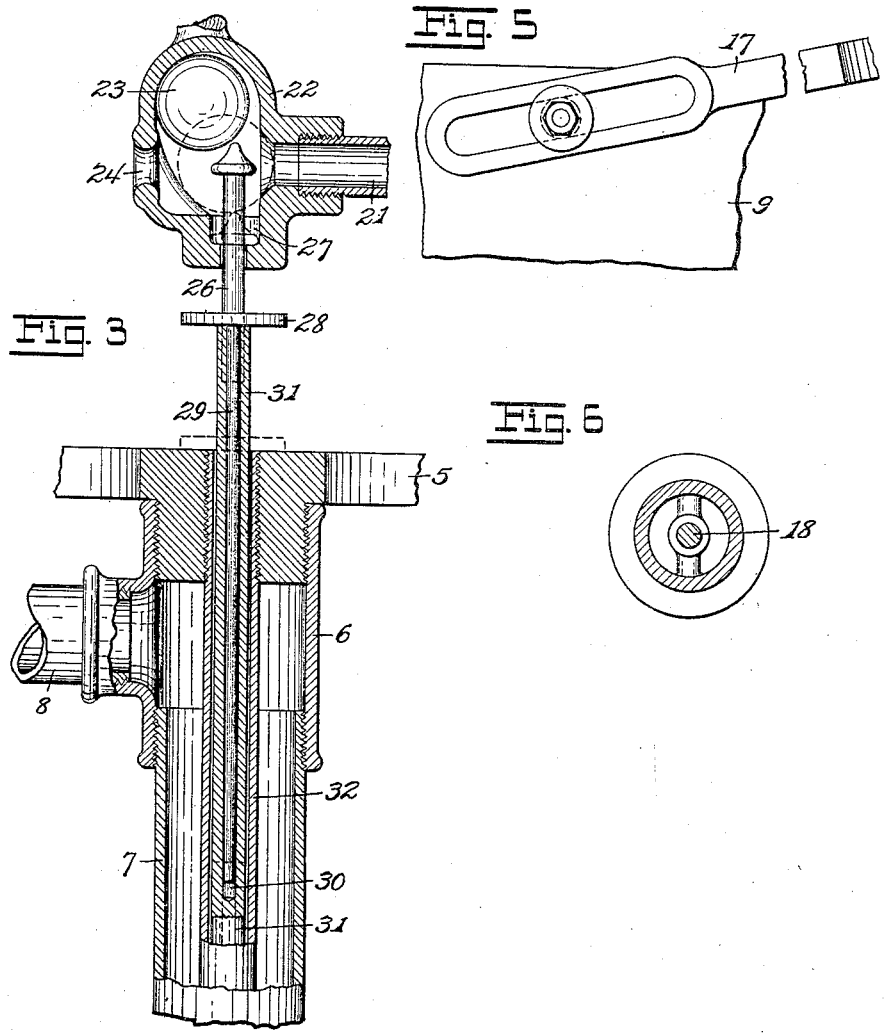
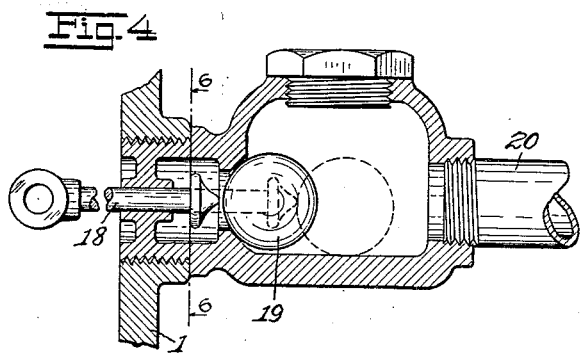
INVENTOR
Michael G. Carney.
By
ATTORNEY

UNITED STATES PATENT OFFICE.

MICHAEL G. CARNEY, OF YOUNGSTOWN, OHIO.

STEAM-TRAP.

1,199,245.     Specification of Letters Patent.     Patented Sept. 26, 1916.

Application filed December 1, 1915.   Serial No. 64,420.

*To all whom it may concern:*

Be it known that I, MICHAEL G. CARNEY, a citizen of the United States of America, and resident of Youngstown, county of Mahoning, and State of Ohio, have invented certain new and useful Improvements in Steam-Traps, of which the following is a specification.

This invention relates broadly to steam traps, and it has for its object to provide a steam or vacuum trap which possesses various advantages over the traps now in common use, which is structurally simple and durable, and which is particularly efficient in operation.

With these and other objects in view, the invention resides in the features of construction, arrangement of parts and combinations of elements which will hereinafter be fully described, reference being had to the accompanying drawings, in which—

Figure 2:
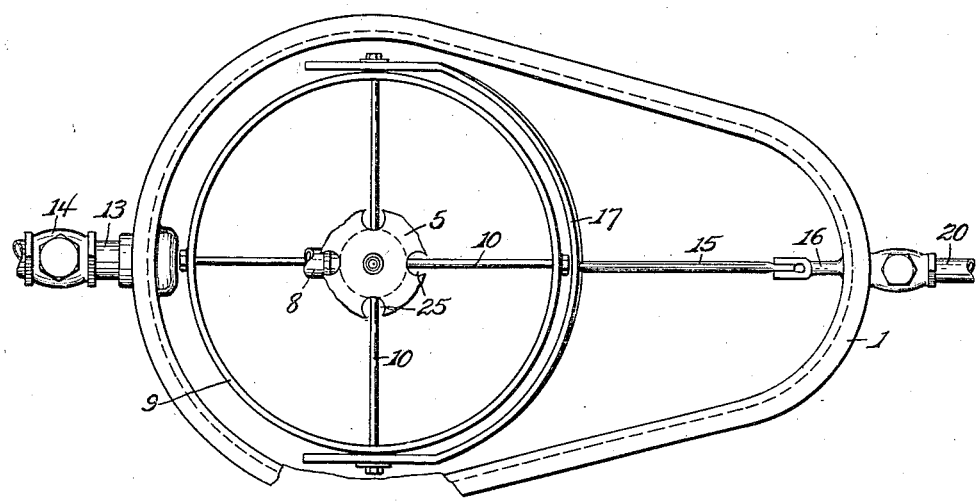
Figure 1:
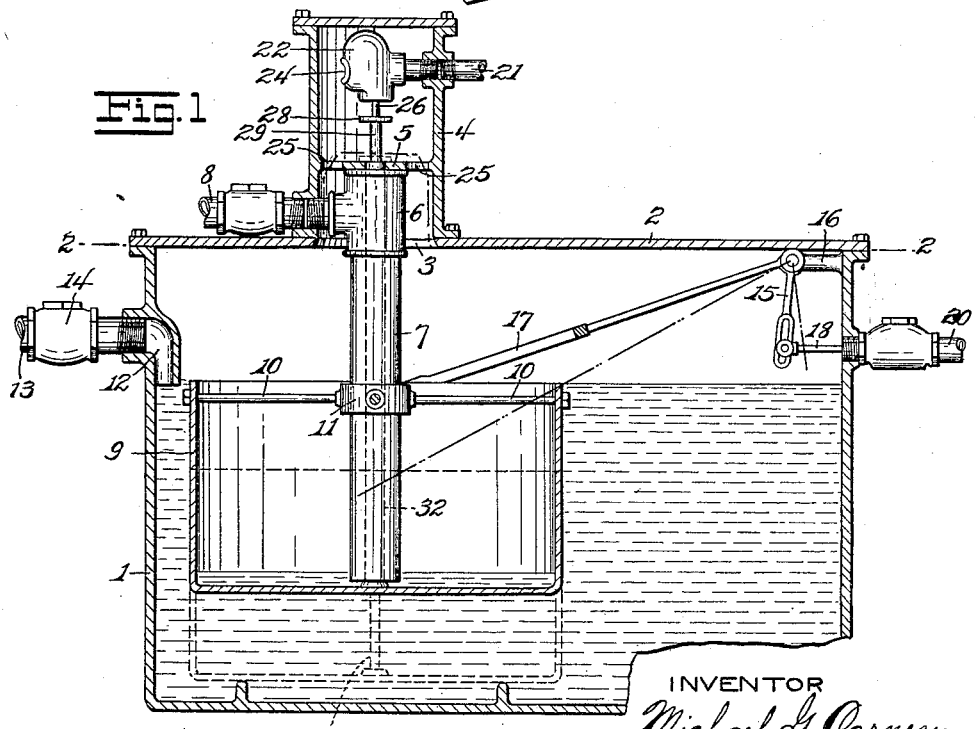

Figure 1 is a vertical section of the invention; Fig. 2 is a horizontal section on the line 2—2, Fig. 1; Fig. 3 is an enlarged detail section illustrating parts of the invention; Fig. 4 is an enlarged longitudinal section of the steam inlet valves; Fig. 5 is an enlarged fragmentary view showing the connection of one member of the yoke to the bucket; and Fig. 6 is a section on the line 6—6, Fig. 4.

Referring to said drawings, in which like designating characters distinguish like parts throughout the several views—1 indicates generally a main casing having a removable cover 2. Said casing is herein shown as being of ovoid form in horizontal section, but it will be understood that the same may be of any other appropriate form. Provided in said cover 2 at a suitable point is an aperture 3 which is encircled by the base of a substantially cylindrical relatively small casing 4 which is rigidly mounted on said cover. Said small casing has a horizontally disposed partition 5 located intermediate its ends, and rigidly supported by said partition is one arm of a T-coupling 6 from the opposite arm of which is suspended a vertical tube 7. Connected to the stem of said coupling and leading laterally therefrom to and through a side of the small casing 4 is a pipe 8 through which water resulting from condensation is discharged, as will hereinafter be explained.

Located within the main casing 1 is a bucket float 9. Carried on the arms 10 of a spider which is mounted on the upper end of said bucket is a centrally disposed collar 11 which embraces and has sliding movement on the vertical tube 7. Said tube has its lower end located at such a height that it will be closely approached by the bottom of the bucket when the latter occupies its normal elevated position.

Water enters the interior of the casing 1 through an inlet opening 12 located at a suitable point, as in the side of said casing near its top, being conducted by a pipe 13 to said opening or passage from a main exhaust or vacuum line leading from a condenser (not shown), said pipe 13 having a suitable normally open check valve 14 located therein, as shown.

A bell-crank lever 15 is pivotally mounted in the upper part of the casing at a suitable point, as upon a supporting lug 16 carried by said casing. One arm of said lever is rigidly connected to a yoke 17, the opposite members or terminals of which are pivotally connected to the bucket on opposite sides of the latter. The other arm of said lever has pivotal connection with the end of a horizontally disposed pin 18 which is horizontally movable through the casing wall and is adapted to be projected outward for unseating a ball-check valve 19 located in a steam line 20 which leads into said casing 1. When the bucket occupies its normal elevated position, as shown in full lines in Fig. 1, the bell-crank lever 15 holds the pin 18 withdrawn in a position wherein the valve 19 is permitted to seat under the pressure of the steam in the steam line 20. When, however, the bucket sinks under the weight of water which has overflowed its top, the lever 15 actuates the pin 18 to unseat the valve 19, admitting steam to the interior of the casing. Under pressure of the admitted steam the water in the bucket is forced upward through the tube 7 and is discharged through discharge pipe 8. As the water is thus discharged the bucket again rises and the pin 18 is withdrawn, permitting the valve 19 to seat for cutting off the steam.

In order to relieve the steam pressure within the casing and thus to equalize the pressures on opposite sides of the check-valve 14, permitting the latter to open automatically and the inflow of water to be resumed when the bucket has raised after emptying, a by-pass is provided, the same leading through a pipe 21 to an appropriate point, as to a suction pipe, to an air pump from the condenser, or to the main vacuum or exhaust line from the engine to the condenser. Said by-pass embodies, in addition to said pipe 21, which latter leads outward through the wall of the small casing 4, a valve casing 22 rigidly supported within said casing 4 above the partition 5 thereof and having direct communication with said pipe 21. A ball-check valve 23 disposed within said valve casing 22 normally remains seated, closing communication with said pipe 21, as is shown in dotted lines in Fig. 3. Free access for the steam pressure contained within the casing 1 is had to the interior of the valve casing 22 through a port 24 provided in the side of the latter, it being understood that steam is admitted to the upper part of said small casing 4 through apertures 25 provided in the partition 5 and located laterally with respect to the position occupied by the T-coupling 6. A headed pin 26 is vertically movable through the under side of said valve casing 22 and normally remains suspended with its head disposed in a pocket 27 provided therefor in said valve casing so as to be in non-interfering relation to said valve 23. Said pin 26 has such a length that, when it occupies the seated position aforesaid, its lower end is located a spaced distance above the head 28 of a vertically movable pin 29 which head normally rests upon the top face of the partition 5, as shown in dotted lines in Fig. 3. Said pin 29 is slidably mounted within a bore 30 provided in the upper end of a rod 31 which has its lower end rigidly attached to the bucket bottom. Said rod 31 is slidably mounted within a vertical tube 32 having its upper end attached to the partition 5 and which is concentrically disposed within the tube 7, being of materially less diameter than the latter, as shown, so as to accord a free passage therebetween for the discharging water. As is obvious, the rod 31 lowers with the bucket 59 any level assumed by the latter, and when said bucket occupies the limit of its lowering movement, the upper end of said rod is wholly withdrawn from engagement with the head 28 of pin 29, permitting said head to seat, as shown in dotted lines in Fig. 3. Consequently, when the bucket occupies its lowered emptying position the headed pin 26 occupies its lowered or suspended position, permitting the valve 23 to hold the by-pass closed. As the bucket rises, after emptying, to an elevated position, the upper end of the rod 31 engages the under side of the head 28 of the pin 29 and elevates the latter therewith. At a point in the upward movement of the bucket, such point being determined by the length of the headed pin 26, the latter is engaged by the head 26; and, with further movement of the bucket, the said pin 26 is elevated, effecting the unseating of the ball-check valve 23, permitting an equalization of pressure on opposite sides of the normally open inlet check valve 14, the excess pressure within the trap being allowed to escape through the by-pass pipe 21.

It will be noted that, when the parts are properly adjusted, the ball-check valve 19 in the steam line 20 is permitted to seat for cutting off admission of steam to the trap at substantially the instant that the by-pass is opened by the unseating of ball-check valve 23.

What is claimed is—

1. In a steam trap, a casing having an inlet, a tube rigidly secured in the casing, a float having a spider the latter loosely engaging the tube whereby the latter provides a guide for the float, a rod rigidly secured to the float and having a bore extending through its upper end, an upper casing on the main casing having a partition therein, a guide tube receiving said rod and having its upper end secured to said partition, a steam inlet, means operated by the float to control the steam inlet, a valve controlled by-pass, a pin receivable in the bore of said rod and having a head engageable with the partition to limit the down movement of the pin, said head being engageable with the valve of the by-pass to unseat said valve.

2. In a steam trap, a casing having an inlet, a tube rigidly secured in the casing, a float, a rod rigidly secured to the float and having a bore extending through its upper end, an upper casing on the main casing having a partition therein, a guide tube receiving said rod and having its upper end secured to said partition, a steam inlet, means operated by the float to control the steam inlet, a valve controlled by-pass, a pin receivable in the bore of said rod and having a head engageable with the partition to limit the down movement of the pin, said head being engageable with the valve of the by-pass to unseat said valve.

3. In a steam trap, a casing having an inlet, a sub-casing on the main casing having a perforated partition therein, a T-coupling supported by said partition and having one arm extending into the main casing and a second arm extending through a side of the sub-casing, a tube supported by the arm which extends into the main casing, a float in the main casing, a float-controlled steam inlet, a valve casing in the sub-casing above the partition having a part therein, and a rod connected to the float and extending through the tube for unseating the last named valve.

4. In a steam trap, a casing having an inlet, a rigid tube in the casing, a float, means connected to the float and slidingly engaging the tube to guide the float, a rod rigidly secured to the float and sliding within the tube, a valve-controlled by-pass, means independent of and to operate the valve of said by-pass, means to limit the down movement of said operating means, and means whereby said rod upon up movement of the float will engage the valve operating means and unseat the valve.

5. In a steam trap, a casing having an inlet, a rigid tube in the casing, a float, a rod slidable in the tube and rigidly connected to the float, a valve controlled by-pass, a device including a pin independent of and for unseating the valve of the by-pass, and means to limit the down movement of said device so as to normally hold the latter out of engagement with the valve of the by-pass, said rod having a bore receiving the pin of said device and to actuate the latter upon up movement of the float.

6. In a steam trap, a casing having an inlet, a rigid tube in the casing, a float, a rod rigidly secured to the float and sliding within the tube, a valve controlled by-pass, means independent of and to operate the valve of said by-pass, means to limit the down movement of said operating means, and means whereby said rod upon up movement of the float will engage the valve operating means and unseat the valve.

In testimony whereof, I affix my signature in presence of two subscribing witnesses.

MICHAEL G. CARNEY.

Witnesses:
 OWEN P. HERNAN,
 JNO. G. WITTS.

Copies of this patent may be obtained for five cents each, by addressing the "Commissioner of Patents, Washington, D. C."